US008650288B2

(12) United States Patent
Yamuna et al.

(10) Patent No.: US 8,650,288 B2
(45) Date of Patent: Feb. 11, 2014

(54) RUNTIME USAGE ANALYSIS FOR A DISTRIBUTED POLICY ENFORCEMENT SYSTEM

(75) Inventors: Prakash Yamuna, Union City, CA (US); Nickolas Kavantzas, Emerald Hills, CA (US)

(73) Assignee: Oracle International Corporation, Redwood Shores, CA (US)

( * ) Notice: Subject to any disclaimer, the term of this patent is extended or adjusted under 35 U.S.C. 154(b) by 282 days.

(21) Appl. No.: 13/118,944

(22) Filed: May 31, 2011

(65) Prior Publication Data

US 2012/0131469 A1    May 24, 2012

Related U.S. Application Data

(60) Provisional application No. 61/417,180, filed on Nov. 24, 2010.

(51) Int. Cl.
*G06F 15/173* (2006.01)

(52) U.S. Cl.
USPC ........... 709/224; 709/206; 709/220; 709/223; 726/1; 715/736

(58) Field of Classification Search
USPC ........ 709/206, 220, 223, 224; 726/1; 715/736
See application file for complete search history.

(56) References Cited

U.S. PATENT DOCUMENTS

| | | | |
|---|---|---|---|
| 6,516,416 B2 | 2/2003 | Gregg et al. | |
| 7,290,288 B2 | 10/2007 | Gregg et al. | |
| 7,725,605 B2 | 5/2010 | Palmeri et al. | |
| 2006/0053120 A1 * | 3/2006 | Shum et al. | 707/100 |
| 2006/0075465 A1 | 4/2006 | Ramanathan et al. | |
| 2006/0206440 A1 | 9/2006 | Anderson et al. | |
| 2006/0230430 A1 | 10/2006 | Hondo et al. | |
| 2008/0148345 A1 | 6/2008 | Rubio | |
| 2008/0189760 A1 * | 8/2008 | Rosenberg et al. | 726/1 |
| 2009/0099860 A1 | 4/2009 | Karabulut et al. | |
| 2009/0099882 A1 | 4/2009 | Karabulut | |
| 2009/0125612 A1 * | 5/2009 | Rabetge et al. | 709/220 |
| 2010/0030890 A1 | 2/2010 | Dutta et al. | |
| 2010/0064184 A1 * | 3/2010 | Almeida et al. | 714/57 |
| 2010/0077455 A1 | 3/2010 | Nishio et al. | |

(Continued)

OTHER PUBLICATIONS

Non Final Office Action for U.S. Appl. No. 13/118,940 (Feb. 13, 2013). 9 pages.

(Continued)

*Primary Examiner* — Wing F Chan
*Assistant Examiner* — Hitesh Patel
(74) *Attorney, Agent, or Firm* — Kilpatrick Townsend & Stockton LLP

(57) ABSTRACT

In one set of embodiments, methods, systems, and apparatus are provided for determining, by a server, a policy association between a web service policy and a policy subject associated with an application hosted by the server, the policy association being made while the server is offline, generating a runtime usage association based on the policy association, wherein the runtime usage association is between the web service policy and the policy subject; and generating a user interface based upon the runtime usage association, the user interface displaying one or more web service policies associated with one or more policy subjects of the application. The runtime usage association may be updated in response to a change to the policy association made by an administrative tool, where the change and the updating occur in real time while the server is online.

25 Claims, 7 Drawing Sheets

(56) References Cited

U.S. PATENT DOCUMENTS

| | | | |
|---|---|---|---|
| 2010/0115075 A1* | 5/2010 | Chen et al. | 709/223 |
| 2010/0153695 A1 | 6/2010 | Bussard et al. | |
| 2010/0269148 A1* | 10/2010 | Almeida et al. | 726/1 |
| 2011/0035650 A1 | 2/2011 | Jardine-Skinner et al. | |
| 2011/0047451 A1 | 2/2011 | Jardine-Skinner et al. | |
| 2011/0131275 A1 | 6/2011 | Maida-Smith et al. | |
| 2012/0110093 A1 | 5/2012 | Tingstrom et al. | |
| 2012/0131164 A1 | 5/2012 | Bryan et al. | |
| 2012/0216100 A1 | 8/2012 | Jardine-Skinner et al. | |

OTHER PUBLICATIONS

Non Final Office Action for U.S. Appl. No. 13/149,049 (Mar. 5, 2013). 14 pages.

Non Final Office Action for U.S. Appl. No. 13/149,065 (Dec. 4, 2012).

Bajaj et al. "Web Services Policy Framework (WS-Policy)" Version 1.2, BEA Systems, Inc. (Mar. 2006).

Christensen et al. "Web Services Description Language (WSDL)" version 1.1, World Wide Web Consortium (Mar. 2001).

Phan et al. "Quality-Driven Business Policy Specifications and Refinement for Service-Oriented Systems," Proceedings of the 6th International Conference on Service-Oriented Computing (ICSOC 2008) 5364:5-21 (2008).

Non Final Office Action for U.S. Appl. No. 13/149,037 (May 1, 2013), 8 pages.

Shute, et al., "DataPower SOA Appliance Service Planning, Implementation, and Best Practices," IBM Redbook, SG24-7943-00, Jun. 28, 2011.

Nordbotten, N.A., "XML and Web Services Security Standards," Communications Surveys & Tutorials, IEEE, vol. 11, No. 3, pp. 4,21, 3rd Quarter 2009.

Final Office Action for U.S. Appl. No. 13/149,065 (Jul. 3, 2013), 20 pages.

Non Final Office Action for U.S. Appl. No. 13/436,940 (Jul. 15, 2013), 30 pages.

Final Office Action for U.S. Appl. No. 13/118,940 (Aug. 29, 2013) 10 pages.

Notice of Allowance for U.S. Appl. No. 13/149,049 (Sep. 17, 2013) 10 pages.

Notice of Allowance for U.S. Appl. No. 13/149,037 (Oct. 8, 2013) 7 pages.

* cited by examiner

RUNTIME USAGE ANALYSIS FOR A DISTRIBUTED POLICY ENFORCEMENT SYSTEM

RELATED APPLICATIONS

This application claims the benefit and priority under 35 U.S.C. 119 (e) of U.S. Provisional Application Ser. No. 61/417,180, filed Nov. 24, 2010, entitled RUNTIME USAGE ANALYSIS FOR A DISTRIBUTED POLICY ENFORCEMENT SYSTEM USING EXTERNAL POLICY ATTACHMENTS AND DIRECT POLICY ATTACHMENTS, the contents of which are herein incorporated by reference in their entirety for all purposes.

This application also incorporates by reference for all purposes the entire contents of the following related and commonly-assigned non-provisional applications, all filed concurrently with the present application:
(1) U.S. application Ser. No. 13/149,037 entitled Identifying Compatible Web Service Policies;
(2) U.S. application Ser. No. 13/118,940 entitled Optimizing Interactions Between Co-Located Processes;
(3) U.S. application Ser. No. 13/149,049 entitled Propagating Security Identity Information to Components of a Composite Application;
(4) U.S. application Ser. No. 13/149,065 entitled Nonconforming Web Service Policy Functions;
(5) U.S. application Ser. No. 13/118,947 entitled Attaching Web Service Policies to a Group of Policy Subjects.

BACKGROUND

Embodiments of the present invention relate generally to configuration and management of distributed computer systems, and more particularly to use and analysis of policies applied to both web service clients and web services in such systems.

Information technology provides automated systems to meet the needs of organizations, but factors such as the complexity of the systems, changing markets, increasing competitive pressures, and evolving customer needs are creating demand for more flexible and efficient systems. Enterprise applications can be structured as web service clients that invoke web services via the Internet or other communications network via defined interfaces. A component that provides an element of functionality, such as executing a transaction, computing a value, storing information in a database, and other operations, can be provided in the form of a web service, which has a defined input service interface of one or more operations and associated input parameters, and, ordinarily, a defined reference interface of operations that the web service invokes, e.g., to delegate tasks to other web services. The reference interface corresponds to the service interface of the web service to be invoked. These invocations can be performed by, for example, sending messages via a computer network from an invoking service or application to the referenced service. Service Oriented Architectures (SOA) provide frameworks and conventions for creating applications using this service-oriented architecture.

SOA facilitates the development of enterprise applications as modular web services that can be easily integrated and reused. SOA defines how the services interact, so that different applications can be integrated. Applications can communicate with the services via Web protocols such as HTTP. SOA defines service interfaces in terms of protocols and features. Clients (i.e., applications) can invoke services by exchanging messages, e.g., a request message from the application to a server that implements the service, and a response message from the server back to the application after executing the service. Services can also be invoked by other services. Messages can be sent and received via channels, e.g., network connections. A "binding" establishes the connection between an SOA composite application and the external world. There are two types of binding components: services, which provide the outside world with an entry point to the SOA composite application and describe the protocols that can communicate with the service (for example, SOAP/HTTP or a JCA adapter), and references, which enable messages to be sent from the SOA composite application to external services in the outside world. Services use "endpoints" to access the channels and send/receive messages. An endpoint is an association between a binding and a network address that may be used to communicate with a service. Thus an endpoint indicates a specific address for accessing a service using a specific protocol and data format.

Each service provides an operation, such as a bank account deposit. An application or another service calls an appropriate Application Programming Interface (API) function of the SOA system to invoke the service by passing messages according to the protocol for accessing the service. This process of invoking a service is also referred to herein as "invocation" of the service. Data can be included in the invocation message in accordance with a data format specified by metadata associated with the binding. SOA provides features for specifying desired "quality of service" parameters that applications and services are to adhere to when invoking services and processing service invocations, respectively. One type of quality of service is security, which includes user authentication, data encryption, authorization of users to perform particular operations, and the like. Security-related parameters, such as details of how security is to be implemented, e.g., which type of authentication and encryption to use, can be specified by system users or administrators as "security policies" that can be attached to or associated with service input interfaces and reference interfaces. A security policy can be understood as a data item that includes a specific value for a parameter, e.g., the name of a specific type of encryption. When a security policy is attached to a service, the service can implement security features in accordance with the parameters specified in the policy. Thus, application developers can provide flexible security features by implementing security with reference to policies that can be supplied later, e.g., when the application is deployed for use by a customer, or when the customer's security needs change. The customer can then provide specific policies to configure the security features, e.g., by specifying a particular type of encryption with a particular level of security. The customer associates a security policy with each security-sensitive service using an administrative tool, such as a graphical user interface. When security requirements change, the customer can change the policies accordingly. Other types of quality of service configuration can be performed similarly.

For example, the quality of service of network communication may be configurable between higher-quality settings that have slower performance and lower-quality settings that are faster. A network protocol quality of service parameter can be provided by the application, and a customer who deploys the application can specify a particular setting for the quality of service, e.g., reliable or guaranteed, by attaching a policy that specifies the particular setting to the services in the application.

SOA applications can be implemented using "orchestration" to compose "composite" applications that invoke services. In one example, Business Process Execution Language ("BPEL") is a standardized representation of processes, and the SOA system provides a process engine or manager that enables users to design and execute BPEL processes that invoke the services. The details of the application and services, and the formats of the data that is exchanged, e.g., between different BPEL processes in a composite application, are described by metadata associated with corresponding portions of the services and applications, such as data types associated with bindings.

SUMMARY

In one or more embodiments, a policy manager component of an application server creates, modifies, and deletes runtime representations of the associations between policies and policy subjects. Policies are, for example, particular ways of enforcing quality of service, such as security policies, which can be, for example, a user name and password authentication policy that enforces a need declared by an application for an authentication policy. Policies can be associated with applications and other components used by applications, such as communication endpoints. These entities with which policies can be associated are collectively referred to a policy subjects.

Users, such as system administrators, can associate policies with subjects via a user interface, an action that is also referred to as attaching a policy to a subject. Representations of the subjects and their attached policies are stored in one or more databases or other form of storage. Since a policy can be attached to several subjects, changes to a policy can affect a number of subjects. A policy usage analysis is therefore generated to indicate which subjects are using a particular policy. The policy usage analysis is generated from a set of runtime usage associations that is, in one or more embodiments, stored in the database separately from the subjects and their attached policies. The runtime usage associations represent the same information as the subjects and their attached policies, but in a different form, e.g., as Policy Attachment ("PA") documents that include lists of subjects. A policy manager maintains the state of the usage policy associations as accurate representations of the subjects and their attached policies, even if the subjects and their attached policies are changed while the policy manager is not running. The policy manager updates the runtime usage associations in response to changes to the subjects and their attached policies, and refreshes the runtime usage associations from the subjects and their attached policies when the application server is brought online from an offline state.

According to an embodiment of the present invention, a method is provided that includes determining, by a server in a computer system, a policy association between a web service policy and a policy subject associated with an application hosted by the server, the policy association being made while the server is offline, generating, by the computer system, a runtime usage association based on the policy association, where the runtime usage association is between the web service policy and the policy subject, and generating, by the computer system, a user interface based upon the runtime usage association, the user interface displaying one or more web service policies associated with one or more policy subjects of the application.

Embodiments of the invention may include one or more of the following features. The method may further include updating the runtime usage association in response to a change to the policy association made by an administrative tool, where the change and the updating occur in real time while the server is online. Determining a policy association may include loading the policy association from a database, wherein the policy is associated in the database with the policy subject. Determining a policy association may include loading the policy association from policy attachment metadata associated with the policy subject. Determining a policy association may further include identifying at least one policy attachment association that is included in the policy attachment metadata and not included in the runtime usage association. Generating a runtime usage association may include storing the runtime usage association in a database at a location determined based upon the web service policy.

The method may further include generating, by the computer system, a usage analysis of the web service policy, where the usage analysis lists at least one policy subject associated with the policy by at least one runtime usage association, and displaying the usage analysis in the user interface. The method may further include generating one or more counts of a number of policy subjects with which the web service policy is associated, where generating the count comprises determining how many policy subjects are associated with the web services policy by one or more runtime usage associations, and displaying the one or more counts in the user interface. The method may further include determining, by the server being executed by the computer system and in response to a request in the user interface to modify the web service policy, whether the web service policy is associated with one or more policy subjects by one or more runtime usage associations, prompting a user to confirm modification of the web service policy if the web service policy is associated with one or more policy subjects, and modifying the web service policy if the user confirms the modification. The policy subject may include a service, a reference, a domain identifier, an application server identifier, an application identifier, or a combination thereof.

According to an embodiment of the present invention, a system is provided that includes a processor configured to determine, by a server, a policy association between a web service policy and a policy subject associated with an application hosted by the server, the policy association being made while the server is offline, generate a runtime usage association based on the policy association, where the runtime usage association is between the web service policy and the policy subject, and generate a user interface based upon the runtime usage association, the user interface displaying one or more web service policies associated with one or more policy subjects of the application.

Embodiments of the invention may include one or more of the following features. The processor may be further configured to update the runtime usage association in response to a change to the policy association made by an administrative tool, where the change and the update occur in real time while the server is online. The processor may be further configured to load the policy association from a database, and the policy may be associated in the database with the policy subject. The processor may be further configured to load the policy association from policy attachment metadata associated with the policy subject. The processor may be further configured to identify at least one policy attachment association that is included in the policy attachment metadata and not included in the runtime usage association. The processor may be further configured to store the runtime usage association in a database at a location determined based upon the web service policy. The processor may be further configured to generate a usage analysis of the web service policy, where the usage analysis lists at least one policy subject associated with the policy by at least one runtime usage association, and display the usage analysis in the user interface.

The processor may be further configured to generate one or more counts of a number of policy subjects with which the web service policy is associated, determine how many policy subjects are associated with the web services policy by one or more runtime usage associations, and display the one or more counts in the user interface. The processor may be further configured to determine, by the server and in response to a request in the user interface to modify the web service policy, whether the web service policy is associated with one or more policy subjects by one or more runtime usage associations, prompt a user to confirm modification of the web service policy if the web service policy is associated with one or more policy subjects, and modify the web service policy if the user confirms the modification. The policy subject may include a service, a reference, a domain identifier, an application server identifier, an application identifier, or a combination thereof.

According to an embodiment of the present invention, a system is provided that includes a non-transitory machine-readable medium for a computer system, the non-transitory machine-readable medium having stored thereon a series of instructions executable by a processor, the series of instructions including instructions that cause the processor to determine, by a server, a policy association between a web service policy and a policy subject associated with an application hosted by the server, the policy association being made while the server is offline, instructions that cause the processor to generate a runtime usage association based on the policy association, wherein the runtime usage association is between the web service policy and the policy subject, and instructions that cause the processor to generate a user interface based upon the runtime usage association, the user interface displaying one or more web service policies associated with one or more policy subjects of the application.

Embodiments of the invention may include one or more of the following features. The non-transitory machine-readable medium of claim 21, the series of instructions further including instructions that cause the processor to update the runtime usage association in response to a change to the policy association made by an administrative tool, where the change and the update occur in real time while the server is online.

DETAILED DESCRIPTION

Figure 1:
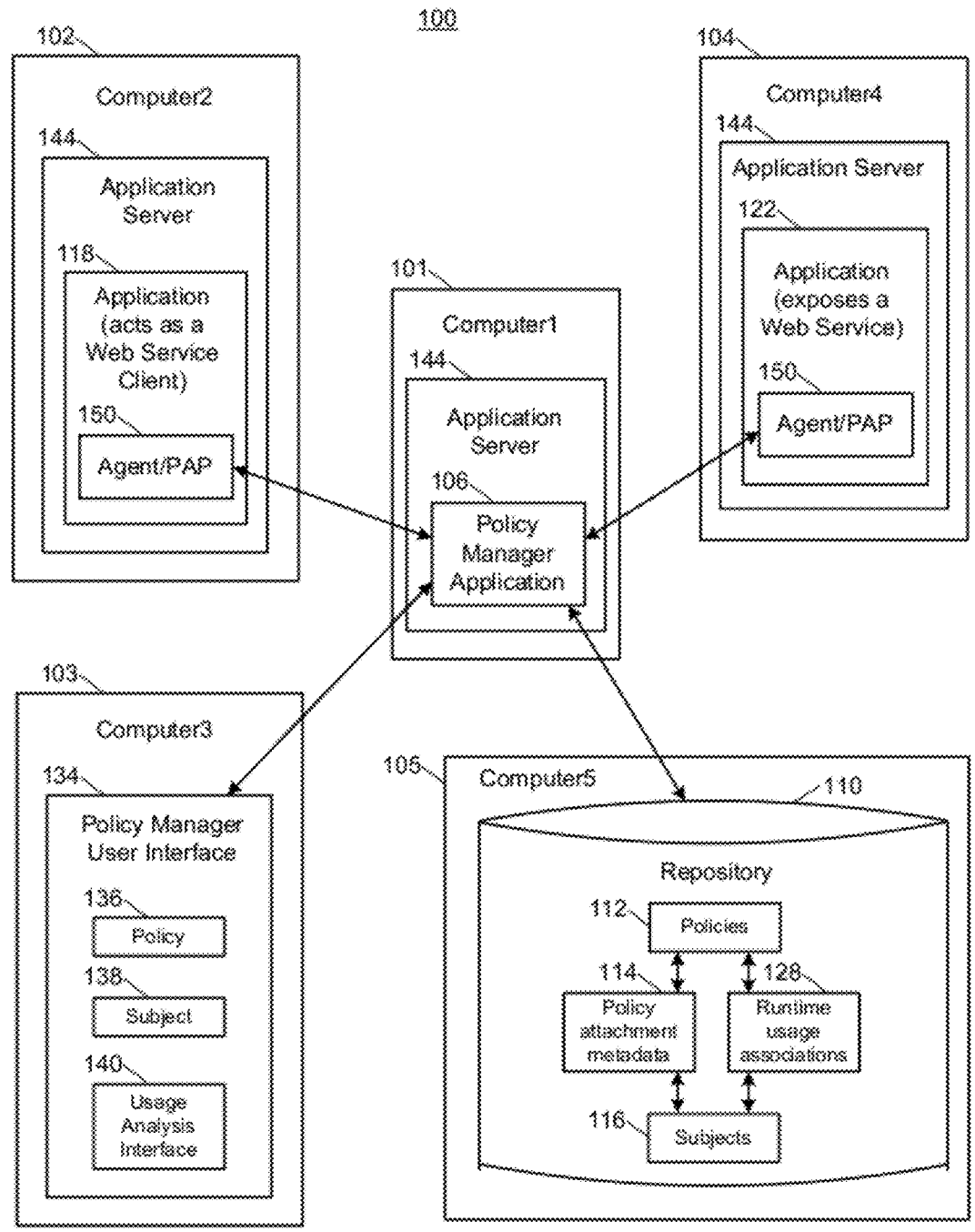
FIG. 1 is a simplified block diagram of service policy features in a process execution system according to an embodiment of the present invention.

In the following description, for the purposes of explanation, numerous details are set forth in order to provide an understanding of embodiments of the present invention. It will be apparent, however, to one of ordinary skill in the art that certain embodiments can be practiced without some of these details.

A system can have numerous interacting applications, each of which can in turn be implemented as using numerous processes, services, and other components, with a multitude of interactions occurring between these components. The components can be distributed across multiple computer systems, with some components located on a single computer, in which case communication may be via direct invocations of program code across components, and other components located on other computers that communicate via a network, such as the Internet or a local area network. Interactions via network communication can be performed by, for example, sending discrete messages between components. The messages can carry information that represents the desired interaction, such as a code that represents an operation to be performed, and data on which the operation is to be performed. There are many possible ways in which these interactions can be implemented, involving different network protocols that can be selected, different programming languages that might be used for different components, different ways in which the interactions may be performed, e.g., using different types security that can be selected from a wide variety of possible encryption and authentication techniques.

The specific techniques, protocols, and the like that are desired in a particular deployment of the system in actual use may not be known at the time the various components are developed, although the component developers may wish to impose certain restrictions on the way other components interact with their component, such as security restrictions to ensure that users do not access the component without proper authorization. Therefore, the system provides a way for components to declare their need for certain types of interactions, such as certain types of security, communication, and the like. In the Service Component Architecture ("SCA") framework, the components can declare their needed interaction characteristics using annotations in their interface or implementation code. The declared needs can be met by attaching (e.g., associating) specific policies that are provided by a system administrator or other user. For example, a component that computes a user's bank account balance may require authentication and confidentiality, and this requirement can be addressed by associating security policies with the component that specify a particular type of encryption and a particular type of authentication.

Quality of service policies, such as security policies, can be attached to, i.e., associated with, policy subjects. Policy subjects can include, for example, resources and components that exist in an enterprise system, such as Services or References, which are analogous to input and output interfaces of a component, respectively. Policy subject can also be identifiers for domains, application servers, applications, and so on, including identifiers for any entity in an enterprise hierarchy. The security policies attached to the Service(s) of a component apply to interactions in which other components invoke (e.g., send messages to) the component. The security policies attached to the Reference(s) of a component apply to interactions in which the component invokes (e.g., sends messages) to another component.

A Service can be thought of as a point at which messages from external clients enter a composite application. A Reference represents a requirement that the composite application has on a Service. According to the SCA Assembly Model Specification, a Service represents an addressable set of operations of an implementation that are designed to be exposed for use by other implementations or exposed publicly for use elsewhere (e.g., public Web services for use by other organizations). The operations provided by a Service are specified by an interface, as are the operations required by the service client (if there is one). An implementation may contain multiple Services, when it is possible to address the Services of the implementation separately. A Service may be implemented as SCA remote services, Web services, stateless session EJB's, EIS services, and so on. SCA References represent a dependency that an implementation has on a Service that is supplied by some other implementation, where the Service to be used is specified through configuration. In other words, a Reference is a Service that an implementation may call during the execution of its business function. References are typed by an interface. For composite applications, composite References can be accessed by components within the composite like any Service provided by a component within the composite. Composite References can be used as the targets of wires from component References when configuring components. A composite Reference can be used to access a Service such as: an SCA Service provided by another SCA composite, a Web service, a stateless session EJB, a database stored procedure or an EIS service, and so on.

The term "policy subject" is used herein to refer to components to which policies can be attached. A policy subject can be a web service client, which is also referred to herein as a Reference, or a web service, which is also referred to herein as a Service. Thus SOA Services and References are both policy subjects. Note that the term "service" is used herein to refer to an interface, set of operations, implementation of an interface, or the like. For example, a web service can be an interface that can be accessed by World Wide Web protocols. A service can also be the input of an application. The capitalized term "Service" is used herein to refer to a SOA Service, which corresponds to an input interface of a SOA application, and is a particular kind of web service. Similarly, the term reference is used herein to denote an entity that can refer to another entity, or an output interface of an application. The capitalized term "Reference" is used herein to refer to a SOA Reference, which corresponds to an output interface of a SOA application, and is a particular kind of reference.

A system can support different types of policies. Types of policies include, but are not limited to, security policies, reliability policies, addressing policies, management policies, message transmission and optimization mechanism (MTOM) policies, custom policies, and so on. For example, security policies implement the WS-Security standards by enforcing authentication and authorization of users, identity propagation, and message protection (message integrity and message confidentiality). A reliability policy may, for example, supports the WS-Reliable Messaging protocol, which is designed to guarantee the end-to-end delivery of messages. As another example, an addressing policy can verify that simple object access protocol (SOAP) messages include WS-Addressing headers in conformance with the WS-Addressing specification. In one example, a management policy logs request, response, and fault messages to a message log. Other policies may categorize this logging behavior in a different manner, e.g., as a logging policy, and may log and/or process different information. In another example, a Message Transmission Optimization Mechanism (MTOM) policy ensures that attachments are in MTOM format. This format enables binary data to be sent to and from web services to reduce the transmission size on the wire.

As introduced above, a user or developer can configure a Service or Reference's desired quality of service by associating a "web service policy" with the Service or Reference. Such an association is also referred to herein as a "policy attachment" or "policy association." In one example, a web service policy that specifies a desired quality of service is stored in a file stored externally to the composite applications and application server, and can be associated with a Service or Reference using a "direct attachment model" to specify that interactions with the Service or Reference are to use that quality of service. For example, a security policy can be attached to a Service to specify the type of security checks that are to be enforced when the Service receives a request message. A Service with a name such as SimpleSoapPort can be associated with a security policy named binding_authorization_denyall_policy by creating a file that corresponds to the binding_authorization_denyall_policy policy and adding the name SimpleSoapPort to the file. This file is stored externally to the application server and can be stored in, for example, a file system or in a repository database for subsequent access by an application server running an application that implements the web service.

In another example, a web service policy can be associated with one or more Services or References by inserting a special XML element referring to the policy file into one of an application's deployment descriptors (e.g., by editing an XML file), or as a code annotation in the application's source code.

FIG. 1 is a simplified block diagram of service policy features in a process execution system 100 according to an embodiment of the present invention. The system 100 may be a software system, a hardware system, an enterprise system, or the like. For example, the system 100 may be a complex enterprise software system such as a database system and related products provided by Oracle Corporation™ of California. As depicted in FIG. 1, the system 100 comprises several computers that communicate with each other via a network such as Ethernet, the Internet, a wireless network, or the like. Computer1 101 hosts, e.g., executes on a processor, an application server 144, which executes a Policy Manager Application ("PM") 106 that provides features for accessing policies 112, subjects 116, and associations 114, 128 between the policies 112 and subjects 116, which are stored in a repository 110. The application server 144 may be, for example, an Oracle® Fusion middleware server, or the like. The Policy Manager application 106 provides computers 102, 103, 104, and 105 with access to the policies 112 via network communication, as shown by the arrows from the PM 106 to Agent/PAP processes 150 hosted on the computers 102 and 104, and to a policy manager user interface 134 hosted on Computer3 103, as well as to the repository 110 hosted on Computer5 105.

Computer2 102 hosts, e.g., loads and executes, an application server 144, which executes an application 118 that acts as a Web Service Client. Computer2 102 also executes an Agent/Policy Access Point ("PAP") 150. The application server 144 uses the PAP 150 to communicate with the Policy Manager ("PM")" application hosted on Computer1 101. The policy manager user interface 134 hosted on Computer3 103 enables users to manage the policies 112, as described in more detail below. Computer4 104 hosts an application server 144, which executes an application 122 that is exposed as a web service. Computer4 104 also executes an Agent/Policy Access Point ("PAP") 150. Computer4's PAP 150 communicates with the application server 144 hosted on Computer1 101 via the Policy Manager ("PM") application 106 on Computer1 101.

Computer5 105 hosts a repository 110, which may be, for example, a database, file system, or other type of storage. The repository 110 stores information used by the application server 144, such as definitions of the applications 122, communication endpoints, and/or metadata such as data schemas.

The applications 122 may be, e.g., Enterprise Java Beans, programs implemented in the Java® or other programming language, Service Oriented Architecture (SOA) composite applications, processes, and the like.

In one or more embodiments, the repository 110 stores service policies 112, which define quality of service (QoS) levels, and policy subjects 116, which represent entities to which the service policies 112 can be attached to enforce quality of service levels. The policy subjects 116 can be stored in a file system, the repository 110, or other storage medium. The service policies 112 can be, for example, security policies that indicate a type of authentication, authorization, or encryption to be applied to communication between and/or within the applications 112. The attachment of particular policies 112 to particular policy subjects 116 is represented by policy attachment metadata 114, and a runtime representation of the policy attachment metadata 114, e.g., for use when generating a policy-subject usage analysis, is stored in the repository 110 and/or the memory 111 as runtime usage associations 128. Service policies are sometimes referred to herein as simply "policies" and policy subjects are sometimes referred to as "subjects" for purposes of brevity.

The subjects 116 represent various types of entities in the system 100, including applications, communication endpoints, such as web service clients, web services, and the like, to which the policies can be attached, i.e., applied. Communication endpoints include web service clients, which are also referred to herein as "references," and web services, which are also referred to herein as "services." The policy attachments represented by the policy attachment metadata 114 can be created and modified by an administrative user via the policy manager user interface 134 or by other types of user interfaces, e.g., a command-line interface. In one or more embodiments, the policy subjects 116 can be Services, References, and Components that can be attached via direct policy attachments. In other embodiments, the policy subjects 116 can correspond to other types of entities such as other resources in the enterprise system. For example, applications server domains can be associated with applications 122 using global policy attachments. The process execution system 100 facilitates execution of the applications 122 in accordance with the service policies 112 that are attached to the applications 122 in accordance with the policy attachment metadata 114.

In one or more embodiments, Computer3 103 hosts a policy manager user interface 134, which displays information about at least one service policy 136 based on the policies 112 stored in the repository 110, and also displays information about at least one policy subject 138 based on the subjects 116 stored in the repository 110, as well as associations between the policy 136 and subject 138 based on the runtime usage associates 128 and/or the policy attachment metadata 114. The policy manager user interface 134 includes a usage analysis interface 140, in which a user can select a policy 136 to view subjects 138 that use the policy 136. The usage analysis interface 140 can display a list of the subjects 138 used by the selected policy, and the user can select one of the subjects 138, in which case the usage analysis interface 140 displays details about the selected subject 138.

In one or more embodiments, the policy manager ("PM") 106 creates, modifies, and deletes runtime usage associations 128 that represent the associations between service policies and policy subjects specified by the policy attachment metadata 114 stored in the repository 110. The runtime usage associations 128 can be implemented as, for example, text document files, data objects, files, or the like. In one aspect, each of the runtime usage associations 128 is a Policy Attachment ("PA") document that represents a particular service policy. One or more subjects may be listed in the PA document. Each subject listed in a policy's PA document (e.g., the Policy1-PA document) represents attachment of the policy to the subject (e.g., the Policy1-PA document can contain the subject names S1 and S2 to indicate that Policy 1 is attached to subjects S1 and S2). For example, a user authentication policy named UserPassword can be represented as a document named UserPassword-PA. Attachment of a UserPassword policy to a policy subject named CheckEmail can then be represented as a runtime usage associations 128 implemented as a document named UserPassword-PA that contains an entry named CheckEmail.

In one or more embodiments, the policy manager 106 maintains additional representations of the associations between policies 112 and subjects 116 in the repository 110 and/or a memory 111, e.g., to provide faster lookup of frequently-accessed associations. Runtime usage associations 128 stored in the memory 111 can represent some or all of the same associations represented by the runtime usage associations 128, though possibly in a different format, e.g., as pairs of service policy identifiers and policy subject identifiers stored in the memory 111

A policy manager user interface 134 can execute on Computer3 103, e.g., in a web browser that downloads web pages and/or program code that implements the user interface 134 from the policy manager application 106 or other application executing on Computer4 104. The user interface 134 may be a graphical user interface (GUI) displayed on a screen of the Computer3 103, or other device, configured to present information about policies 136, subjects 138, associations between the policies and subjects, and other related information. The policy manager user interface 134 may also allow users, e.g., system administrators, to create, modify, and delete policy-subject associations. In one example, the policy manager user interface 134 enables users to attach policies to policy subjects to form policy-subject associations by selecting a subject such, as an application, web service client, or web service, and then selecting one or more policies to attach to the subject. The policy manager user interface 134 may also provide features for deleting policy-subject associations by detaching selected policies from selected subjects, and updating policy-subject associations, e.g., by detaching a selected policy from a selected subject and attaching a different selected policy to the subject.

In accordance with one or more embodiments, the policy attachment metadata 114 is used by the application server 144 to store the policy attachments that users or administrators create. That is, the policy attachment metadata 114 may be understood, in one aspect, as a correct and up-to-date representation of the policy attachments. The runtime usage associations 128, which can be stored in the repository 110 and/or in the memory 111, can be understood as a partial or complete copy of the policy attachment metadata 114. In one aspect, the runtime usage associations 128 are stored in a different form than the metadata 114, and may have different properties or uses than the metadata 114. For example, the policy manager user interface 134 can use the runtime usage associations 128 to generate policy usage analyses, as described elsewhere herein. The application server 144, and more particularly the server's policy manager 106, can create, modify, and delete policy-subject associations stored in the policy attachment metadata 114. In one example, when making such changes to the metadata 114, the policy manager 106 also makes corresponding changes to the runtime usage associations 128 to maintain the runtime usage associations 128 as up-to-date, accurate representations of the metadata 114.

In one or more embodiments, the policy manager 106 makes the corresponding changes to the runtime usage associations 128 as follows. When the metadata 114 has or may have been changed, the policy manager 106 loads a policy association from the metadata 114 (e.g., from a composite.xml XML file stored in the repository 110 in association with a composite application), and creates a corresponding one of the runtime usage associations 128, such as the Policy Attachment ("PA") document described above, in the repository 110, e.g., in a directory named PolicyAttachments, or a runtime usage association 128 in the memory 111. The policy manager 106 determines the name or identifier of the loaded policy from the name of the PA document (e.g., the document named Policy1-PA corresponds to the policy named Policy1) and determines the names of the subjects to which the policy is attached by reading the subject names from the PA document. The policy manager 106 then creates runtime usage associations 128 based on the policy-subject associations loaded from the PA documents in the metadata 114. In one example, before storing any new entries in the runtime usage associations 128, the policy manager 106 clears the runtime usage associations 128 to an empty state, so that any previously-existing runtime usage associations 128 are replaced with runtime usage associations 128 that correspond to the metadata 114. Each of the runtime usage associations 128 created in the repository 110 includes a policy name or identifier and the associated policy subject(s). The in-memory runtime usage associations 128, if created, include one or more associations, each including the policy name and one (or more) of the associated policy subject(s). Thus, it should be understood that the runtime usage associations 128 can be represented in various ways, such as, but not limited to, the PA documents described above, stored in the repository 110 and/or in the memory 132, or runtime usage associations 128 stored in the memory 111, e.g., in appropriate data structures such as memory records or keys associated with values stored in a hash table.

In one or more embodiments, the runtime usage associations 128 are created, modified, and deleted in response to events that occur in the lifecycle of the composite applications 122 and associated subjects (e.g., services and references) used by the applications 122. For example, when an application 122 is deployed for execution in the application server 144, the runtime usage associations 128 for that application are created in the repository 110 and/or memory 111 based upon the policy attachment metadata 114. Similarly, when an application is un-deployed, i.e., removed from the application server 144, the runtime usage associations 128 associated with that application are deleted from the repository 110. In these situations, and in other situations in which the policy attachment metadata 114 is changed while the application server 144 is online, the policy manager 106 changes the metadata 114 appropriately and makes the corresponding changes to the runtime usage associations 128. For example, the policy manager 106 can change the metadata 114 when an administrative user uses the policy manager user interface 134 to create, modify, or delete policy-subject associations.

There is a possibility that the policy attachment metadata 114 may be modified by an action performed outside the application server 144, such as by a text editor, e.g., Notepad, or another tool that does not update the runtime usage associations 128. If the metadata 114 is modified without making a corresponding modification to the runtime usage associations 128, then the runtime usage associations 128 may differ from the associations represented by the metadata 114. The existence of such a difference for any substantial period of time, e.g., while the application server is enforcing policies for executing applications 122, can result in incorrect system behavior, e.g., use of the wrong policies, or granting of permission to access an endpoint without checking a policy that a user believes has been associated with the endpoint. Thus, in one aspect, the policy manager 106 reloads or at least checks the runtime usage associations 128 at appropriate times to maintain accurate policy attachment metadata 114 that has the same policy-subject associations as the policy attachment metadata 114.

In one example, the policy attachment metadata 114 may have been modified while the application server was not running, e.g., by a user who directly accesses the repository 110 and changes a document in the metadata 114, possibly using a text or XML editor. The policy manager 106 detects such changes, e.g., to direct policy attachments, and applies the changes to the runtime usage associations 128 by refreshing the runtime usage associations 128 when the application server 144 starts up, i.e., is brought online. The policy manager 106 creates runtime usage associations 128 based on the service associations stored in the metadata 114 for each application that is in a deployed state at the time the application server 144 is started. Note that the deployment state of applications is ordinarily independent of whether the application server is running.

In one or more embodiments, the policy manager 106 creates or updates runtime usage associations 128 in at least the following situations: when an instance of the application server 144 is started, when an application 122 is placed in a deployed state, and when the policy manager user interface 134 or other administrative user interface is used to attach the policy to a subject of a deployed application 122 while the application server 144 is running. The policy manager deletes a runtime usage association 128 from repository storage 110 and/or memory 111 in at least the following situations: When an instance of the application server 144 is shut down, when the application 122 is placed in an un-deployed state, and when a configuration interface is used to detach the policy from the service (e.g., while the application server is running) Thus the runtime usage associations 128 are maintained as accurate representations of the policy attachment metadata 114.

If an existing policy 112 or policy attachment 114 is modified, interactions with the associated subjects 116 (e.g., services and references) may change, which can potentially have a substantial impact on the system's operation. Therefore, in one or more embodiments, the policy manager user interface 134 provides a usage analysis interface 140 that displays usage information about displayed policies 136, including the subjects 138 associated with each of the policies 136. The usage analysis interface 140 provides users with a view of how the policies are being used, and the impact of making contemplated policy changes, so that users can understand the effects of changes and take appropriate action before making the changes. In one example, the usage analysis interface 140 displays a usage analysis that shows the policies 136 that are attached (both locally and globally) to a specified policy subject 138.

When the system detects that a policy 136 has been attached to or detached from a policy subject, the policy manager user interface 134 updates the usage analysis interface 140 to show the subjects 138 that are using the policy 136. If a user removes a policy attachment via the policy manager user interface 134 or manual editing of XML descriptor files while the application server is offline (i.e., not running), and then starts the application server 144, the off line changes to the policy attachment metadata 114 are incorporated into the runtime usage associations 128 by the Policy Manager 106. Thus updates are detected at runtime, and the usage analysis interface 140 is updated whenever an operation that changes the policy attachments is detected.

The policy attachment metadata 114 can include global policy attachments, which are, in one or more embodiments, documents that specify one or more subjects to be attached to policies according to defined criteria. In the case of global policy attachments, the policy manager user interface 134 displays a representation of the subjects that are specified and attached to a policy by a global policy attachment. The usage analysis interface 140 displays subjects attached to the policy by global policy attachments as well as by direct policy attachments (i.e., between a specific policy and a specific subject).

As an example, when the application server starts, the runtime usage associations 128 are initially cleared, so that there are initially no associations. In this example, a composite application named CA1 has a service named Service1. A user attaches a policy named Policy1 to CA1 via the policy manager user interface 134. The policy manager 106 creates an entry in the policy attachment metadata 114 representing the Policy1-CA1 attachment, and also creates a document named Policy1-PA in the runtime usage associations 128 with an entry named CA1. Next, a user deletes Policy1. The policy manager then removes the Policy1-CA1 attachment from the metadata 114, and removes the CA1 entry from the Policy1-PA document in the runtime usage associations 128. Since the Policy1-PA document is now empty, the policy manager deletes the document from the repository 110.

Next, while the application server 144 is offline, a user "manually" attaches a policy named Policy2 to an application named CA2 by editing the XML file (e.g., deployment.xml) using a text editor such as Notepad. The user has made an offline change to the metadata 114. The user then starts the application server 144, and the server comes online. The Policy Manager clears any existing runtime usage associations 128 and copies the associations in the metadata 114 to create new runtime usage associations 128. In this example, the policy manager creates a document named Policy2 in the runtime usage associations 128, and adds the name of the application CA2 to the Policy2 document.

In another embodiment, the policy manager 106 does not clear the runtime usage associations 128, but instead compares the metadata 114 to the runtime usage associations 128, and creates new runtime usage associations 128 for any associations that are in the metadata 114 but not in the runtime usage associations 128. The policy manager also modifies any differing runtime usage associations 128 to reflect the current metadata 114, and deletes any existing runtime usage associations 128 that do not exist in the metadata 114.

Continuing the example, a user then creates a global policy attachment named GPA1 that includes the specifications domain=products, type=security, policy=Policy1. The user then attaches GPA1 to CA3. Policy1 is now being used by two subjects: CA1, by direct attachment, and CA3, by global policy attachment. A user can identify the policy subjects that are attached to Policy1 by selecting Policy1 in the usage analysis interface 140, which then displays the names of the subject applications CA1 and CA3. The user is therefore informed that any modifications to Policy1 may impact the subjects CA1 and CA3.

Figure 2:
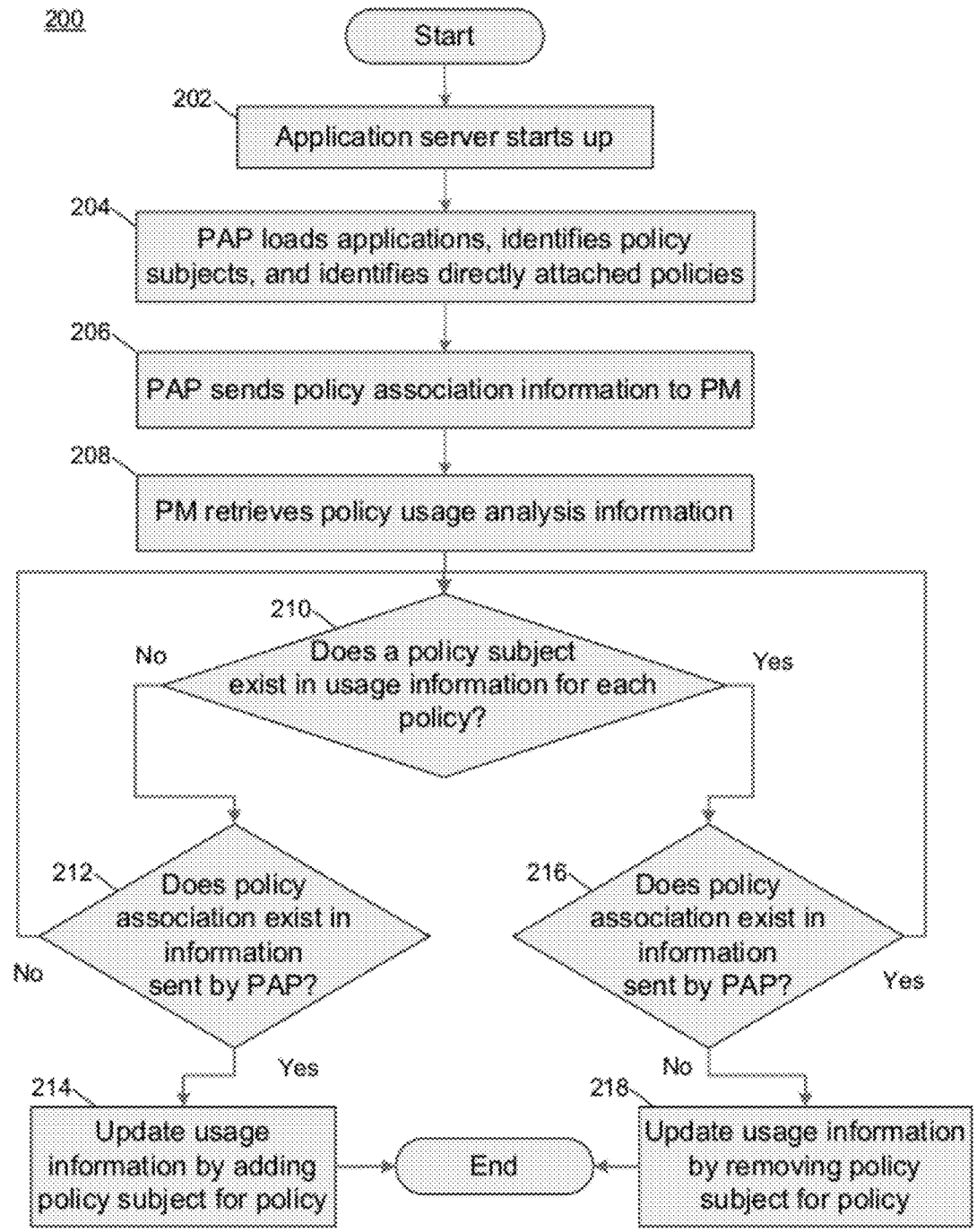
FIG. 2 is a simplified flow diagram illustrating a method for refreshing runtime usage associations according to an embodiment of the present invention.

FIG. 2 is a simplified flow diagram illustrating a method for refreshing runtime usage associations according to an embodiment of the present invention. The processing depicted in FIG. 2 may be performed by software (executed by a processor), hardware, or combinations thereof. The method of FIG. 2 can be performed by, for example, the policy manager 106 of FIG. 1. Block 202 is invoked when an application server such as the server 144 of FIG. 1 is being started, i.e., brought online. In one example, block 202 is invoked when a PAP is brought online. In other embodiments, a method analogous to the method 202 is invoked by the policy manager 106 when an application server 144 executing the policy manager 106 is brought online. At block 204, the application server 144 loads the applications that are to be executed, e.g., all applications in a deployment configuration that has been loaded into the application server 144. Block 204 also identifies the policy subjects in the loaded applications, including the directly attached policies for each policy subject. At block 206, the PAP 150 sends the identified policy association information to the policy manager 106. At block 208, the policy manager 106 receives the policy association information and retrieves usage analysis information 128 for each policy in the repository 110. At block 210, the policy manager 106 checks if a policy subject exists in the usage information 128 for each policy in the repository. If not, then the policy manager determines at block 212 if a policy association exists in the information 128 sent by the PAP 150. If so, then block 214 updates the usage information 128 by adding the policy subject for the policy. Otherwise, if block 212 determines that no policy association exists, then control transfers back to block 210, until all identified policies have been processed. If block 210 determines that a policy subject does exist in the usage information 128 for each policy, then block 216 determines if a policy association exists in the information 128 sent by the PAP. If not, block 218 removes the policy subject for the policy from the usage information 128. Otherwise, if block 216 determines that a policy association does exist in the information 128 sent by the PAP, then control transfers back to block 210, until all identified policies have been processed.

In one or more embodiments, each runtime usage association 128 is stored in a Policy Attachment ("PA") document in the PolicyAttachments directory, and the PA document name is based on the policy name as described above. The PA document includes the names of the subjects associated with the policy in the metadata 114. For example, the policy-subject associations (Policy1, S1) and (Policy1, S2) would be stored in the runtime usage associations 128 as a PA document named Policy1-PA containing list "S1, S2".

In one or more embodiments, the policy attachment metadata 114 can include global policy attachment ("GPA") documents, which can attach policies to policy subjects that are identified using criteria such as attributes of the subjects, without specifying particular subject names. Global policy attachment documents include a specific policy name that specifies the policy to be attached, a policy type (e.g., security), and one or more attribute values, e.g., a domain name, an application name, a service or reference name, and the like, that specify attributes of policy subjects to which the specific policy is to be attached. The specific policy specified in a global policy attachment document is attached, e.g., by the policy manager 106, to one or more policy subjects that have attributes, such as domain name, that match the values specified for the attributes in the global policy attachment document, with certain rules being applied to resolve conflicts between different global policy attachments that specify different specific policies to be attached to the same policy subject. In the runtime usage associations 128, the name of each global policy attachment document, e.g., GPA1, is stored in the PA document that corresponds to the specific policy specified in the global policy attachment document.

For example, if a global policy attachment GPA1 references the specific policy Policy1, then the name of GPA1 would be stored in the Policy1-PA1 document along any policy subject names specified in the metadata 114 as "direct" attachments to Policy1, such as the S1 and S2 subjects from the aforementioned example. Thus, if the metadata 114 includes a global policy attachment, block 208 stores a name or other identifier of the global policy attachment in the runtime usage associations 128, e.g., as an entry in the PA document that represents the global policy attachment's specific policy.

Figure 3:
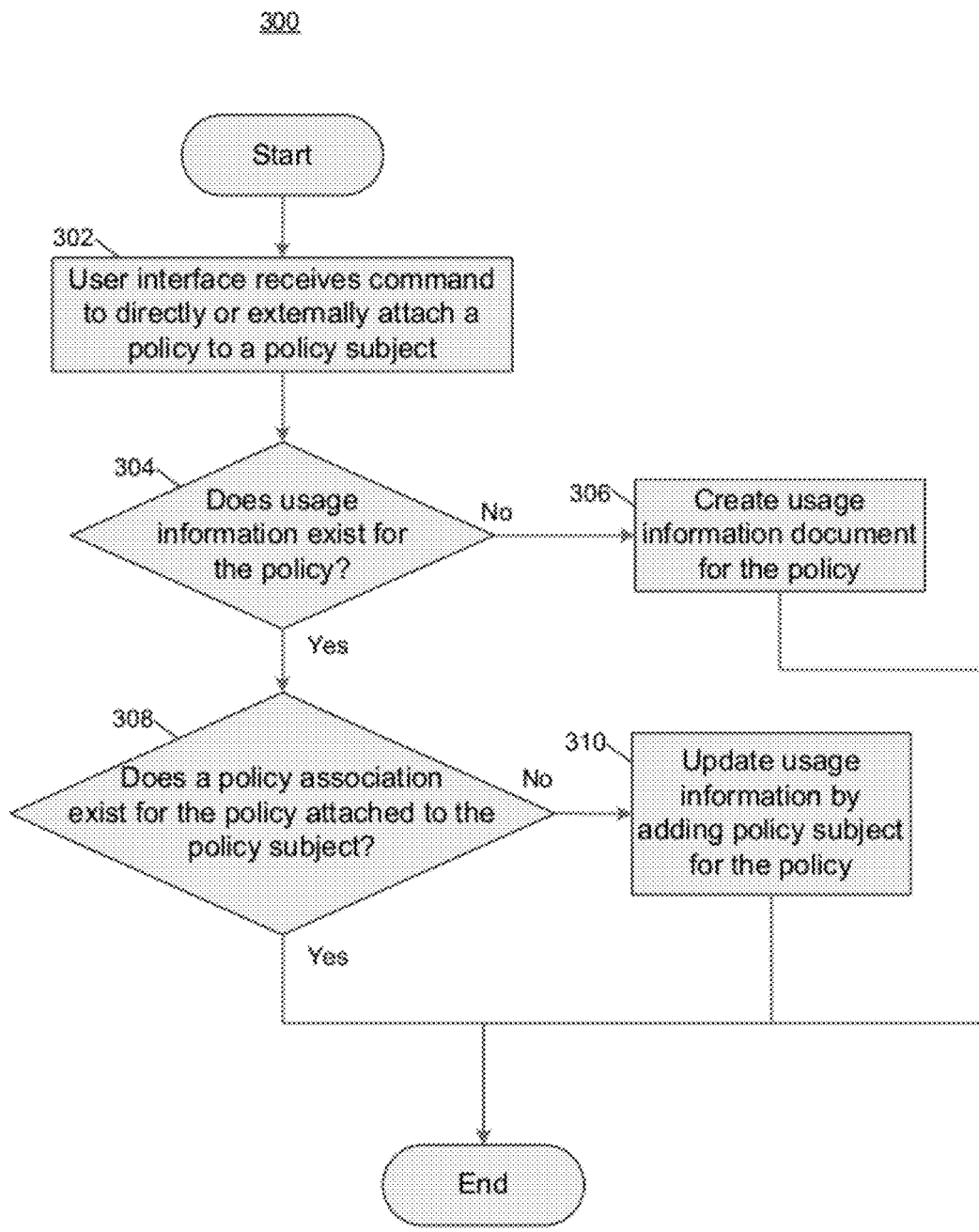
FIG. 3 is a simplified flow diagram illustrating a method for creating a runtime usage association in an online application server according to an embodiment of the present invention.

FIG. 3 is a simplified flow diagram illustrating a method for creating a runtime usage association in an online application server according to an embodiment of the present invention. The processing depicted in FIG. 3 may be performed by software (executed by a processor), hardware, or combinations thereof. The method of FIG. 3 can be performed by, for example, the policy manager 106 of FIG. 1, when the application server 144 is online and a request has been received from the policy manager user interface 134 to attach a policy to a subject. The creation of a metadata entry in the metadata 114 for the new policy association is not shown in FIG. 3 and can be performed by the policy manager 106 (or other entity) before or after the execution of the process of FIG. 3. At block 302, a user interface component such as the policy manager user interface 134 receives a request to directly (e.g., by direct attachment) or externally (e.g., by global policy attachment) attach a policy to a subject. Block 304 determines if usage information exists in the runtime usage associations 128 in the repository 110 for the specified policy. If not, block 306 creates a usage information document for the specified policy (e.g., a document in the PolicyAttachments repository directory, with the document name being based on the specified policy's name). If usage information does exist for the policy, then block 308 determines if a policy association exists in the metadata 114 for the policy attached to the policy subject. If block 308 determines that a policy association does not exist for the policy attached to the policy subject, then block 310 updates the usage information by adding the policy subject for the policy to the runtime usage associations 128. These operations can be performed on a runtime usage association 128 stored in the repository 110, or in another type of storage medium using another suitable data representation.

Figure 4:
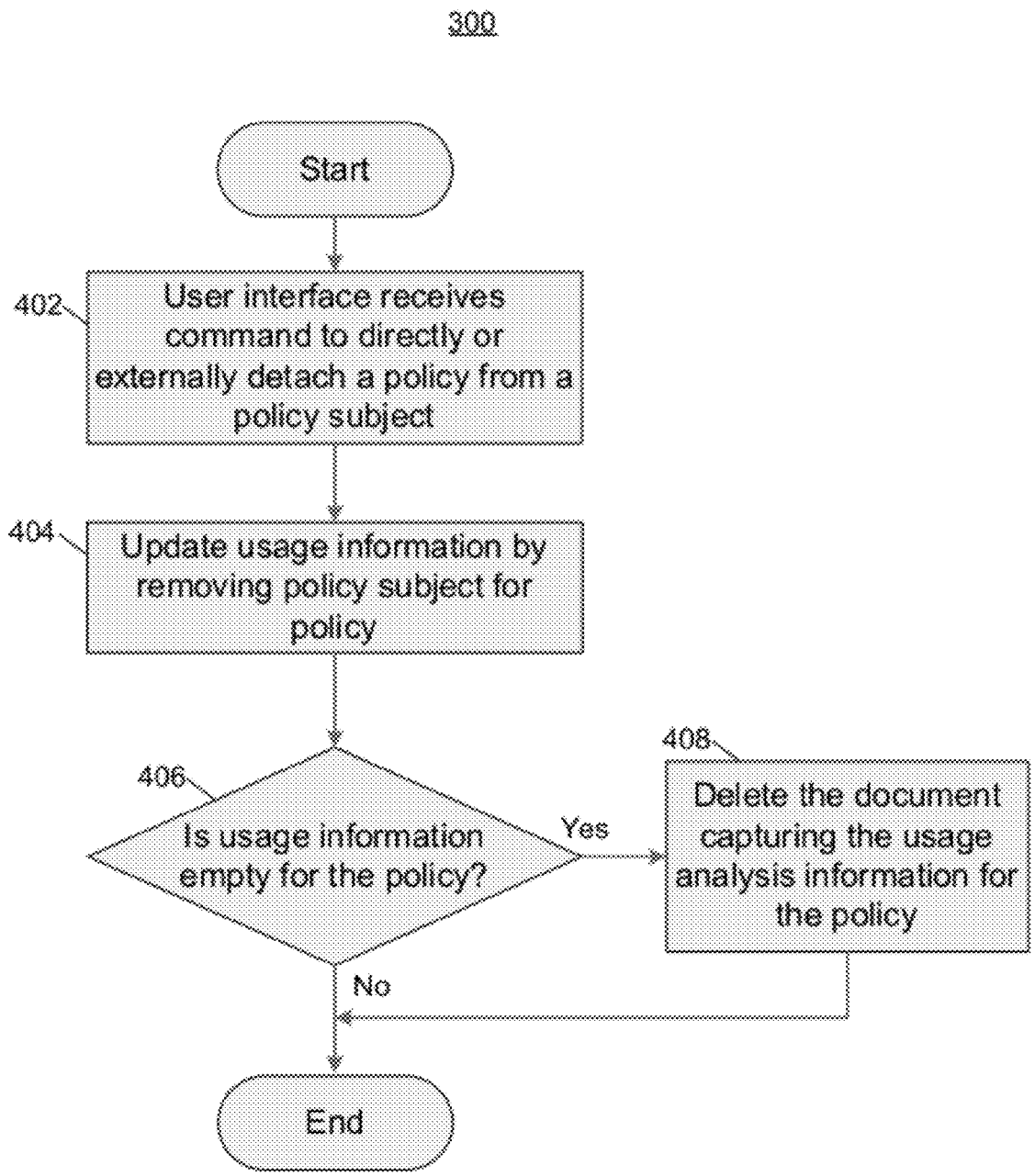
FIG. 4 is a simplified flow diagram illustrating a method for detaching a policy from a service while an application server is online according to an embodiment of the present invention.

FIG. 4 is a simplified flow diagram illustrating a method for detaching a policy from a service while an application server is online according to an embodiment of the present invention. The processing depicted in FIG. 4 may be performed by software (executed by a processor), hardware, or combinations thereof. The method of FIG. 4 can be performed by, for example, the policy manager 106 of FIG. 1, when the application server 144 is online and a request has been received from the policy manager user interface 134 to attach a policy to a subject. Block 402 receives a request to directly or externally detach a policy from a policy subject. Block 404 updates the usage information 128 by removing the specified policy subject for the policy (e.g., removing the Policy1-PA document for a policy named Policy1). Block 406 determines if the usage information that represents the policy is empty, i.e., does not include any other subjects. If so, block 408 deletes the usage analysis information document for the policy (e.g., by deleting the PA document from the PolicyAttachments directory in the repository).

Figures 5A, 5B:
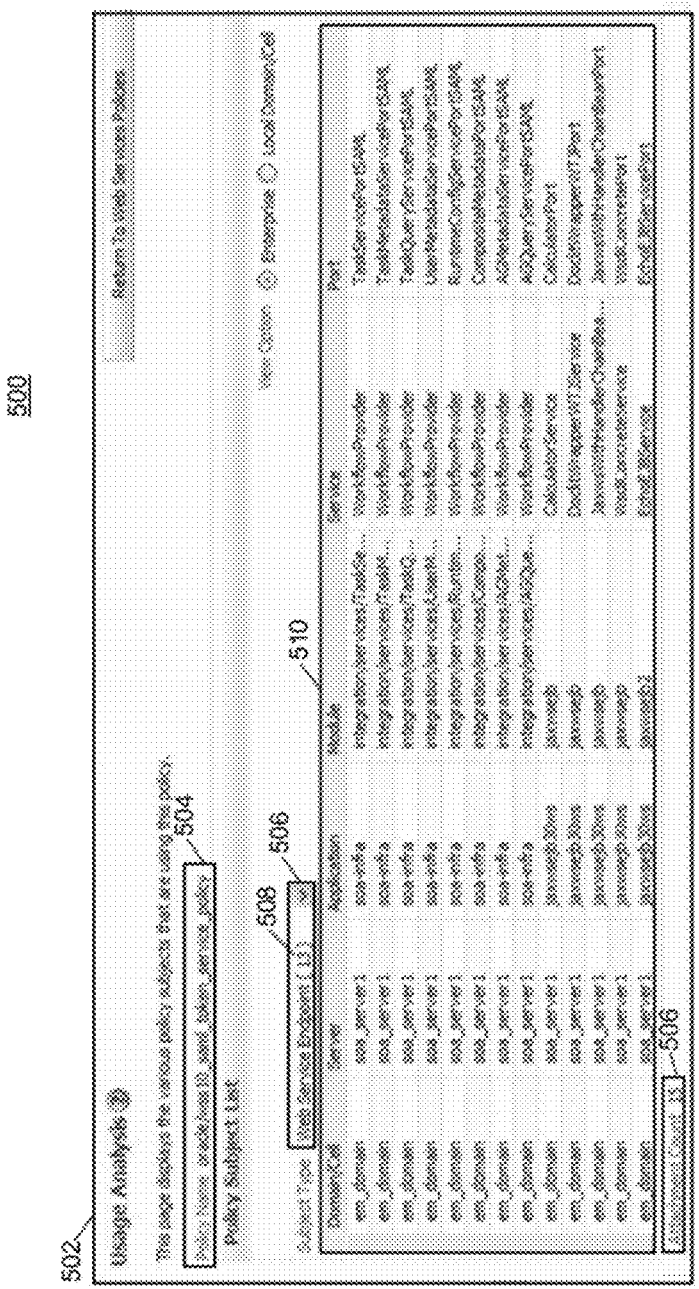
FIGS. 5A and 5B illustrate a usage analysis user interface that can be used in accordance with embodiments of the invention.

FIGS. 5A and 5B illustrate a usage analysis user interface that can be used in accordance with embodiments of the invention. The usage analysis user interface 500 corresponds, in one example, to the usage analysis interface 140 of FIG. 1. The usage analysis user interface 500 includes a web services policy page (not shown), which lists the existing policies and their usage counts. The user can sort the policies, e.g., by usage count to show the policies that are used by the most subjects. A user can select one of the existing policies from the policy page, e.g., by clicking on a policy's usage count, or by selecting a policy, clicking a View link, then clicking an Attachment Count number in a Usage analysis field. Once a policy has been selected, the usage analysis user interface 500 presents a policy view page 502.

The policy view page 502 includes a subject list 510 that lists the subjects that are using, i.e., attached to, the selected policy 504 (wss10_saml_token_service_policy). Subjects of a selected type 506 are included in the list 510. In FIG. 5A, the selected type 508 is Web Service Endpoint, so the subject list 510 includes the web service endpoint subjects that use the policy 504. A count 508 of the number of subjects of the selected type 506 that use the policy 504 is also shown, along with a total attachment count 15, which shows the number of subjects of any type that use the policy 504. The selected type 506 can be changed to other types, such as security, to see the subjects of that type that use the policy 504. The displayed information in the subject list 510 includes the domain, server, application, module, and server associated with each subject in the list.

In one or more embodiments, a user or administrator can create, modify, and delete policies themselves as well as policy attachments using features of the policy manager user interface 134. When a user edits a policy that is being used by at least one subject, the user interface 134 displays a prompt indicating that the policy is being used, along with the name of the subject(s) using the policy. The prompt requests that the user provide an affirmative input to verify that the policy is to be changed. Similarly, when a user selects a command in the user interface 134 to delete a policy, and at least one subject is using the policy, the user interface 134 presents a prompt to the user stating the name(s) of subjects using the policy, with a request that the user confirm the deletion of the policy. The policy will only be changed or deleted in these situations if the user confirms that the change is to be made.

In FIG. 5B, a subject type menu 520 displays the selected subject 506, as is shown in FIG. 5A. The subject type menu 520 can be selected by a user, in which case the menu 520 displays a list of subject types 522. A user can select one of the subject types 522, e.g., SOA Reference or SOA Service, to cause the user interface 500 to display subjects of that type in the list 510. FIGS. 5A and 5B illustrate examples of how policy usage analysis information can be presented. Other or different information may be shown using different interfaces in other embodiments.

Figure 6:
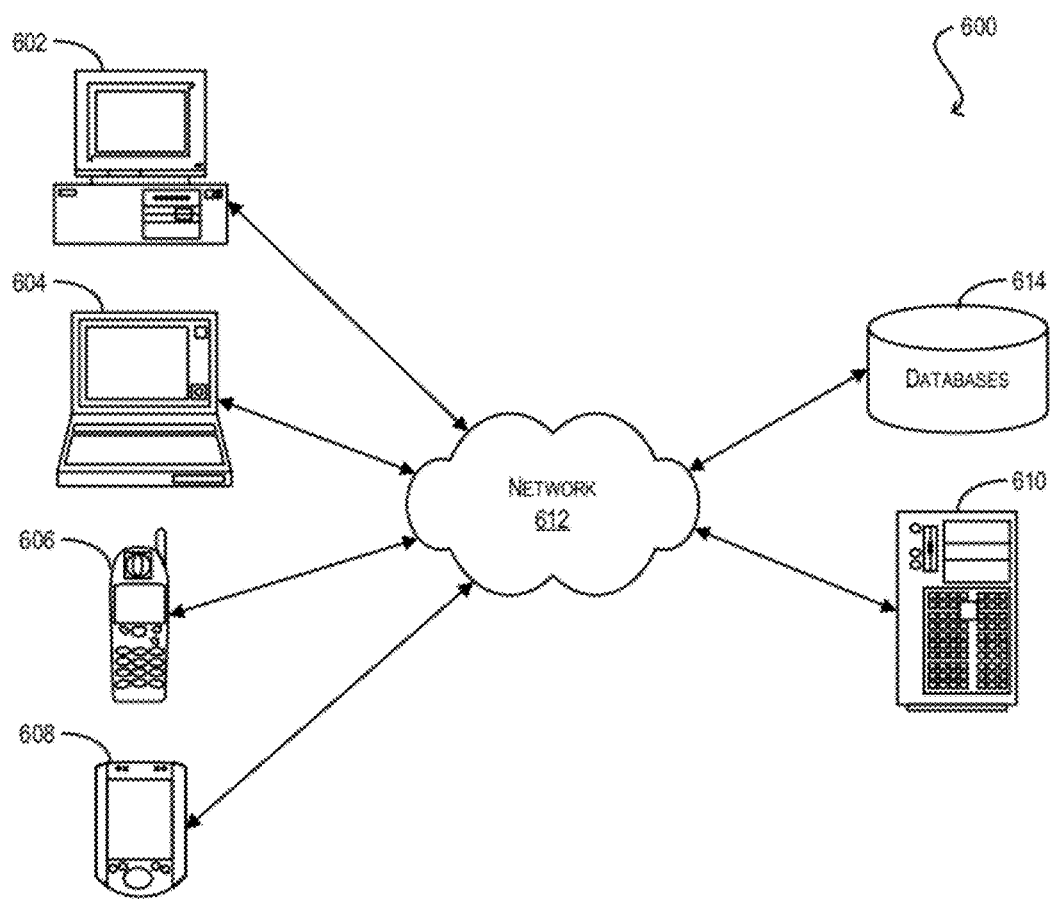
FIG. 6 is a simplified block diagram illustrating a system environment that can be used in accordance with an embodiment of the present invention.

FIG. 6 is a simplified block diagram illustrating a system environment 600 that can be used in accordance with an embodiment of the present invention. As shown, system environment 600 can include one or more client computing devices 602, 604, 606, 608, which can be configured to operate a client application such as a web browser, a UNIX/Solaris terminal application, and/or the like. Client computing devices 602, 604, 606, 608 can be general purpose personal computers (e.g., personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 602, 604, 606, 608 can be any other electronic device capable of communicating over a network, such as network 612 described below. Although system environment 600 is shown with four client computing devices, it should be appreciated that any number of client computing devices can be supported.

System environment 600 can further include a network 612. Network 612 can be any type of network familiar to those skilled in the art that can support data communications using a network protocol, such as TCP/IP, SNA, IPX, AppleTalk, and the like. Merely by way of example, network 612 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 600 can further include one or more server computers 610 which can be general purpose computers, specialized server computers (including, e.g., PC servers, UNIX servers, mid-range servers, mainframe computers, rack-mounted servers, etc.), server farms, server clusters, or any other appropriate arrangement and/or combination. Server 610 can run an operating system including any of those discussed above, as well as any commercially available server operating system. Server 610 can also run any of a variety of server applications and/or mid-tier applications, including web servers, FTP servers, CGI servers, Java virtual machines, and the like. In one set of embodiments, server 610 can correspond to one or more of the computers 101-105 of FIG. 1.

System environment 600 can further include one or more databases 614. In one set of embodiments, databases 614 can include databases that are managed by server 610. Databases 614 can reside in a variety of locations. By way of example, databases 614 can reside on a storage medium local to (and/or resident in) one or more of computers 602, 604, 606, 608, and 610. Alternatively, databases 614 can be remote from any or all of computers 602, 604, 606, 608, and 610, and/or in communication (e.g., via network 612) with one or more of these. In one set of embodiments, databases 614 can reside in a storage-area network (SAN) familiar to those skilled in the art.

Figure 7:
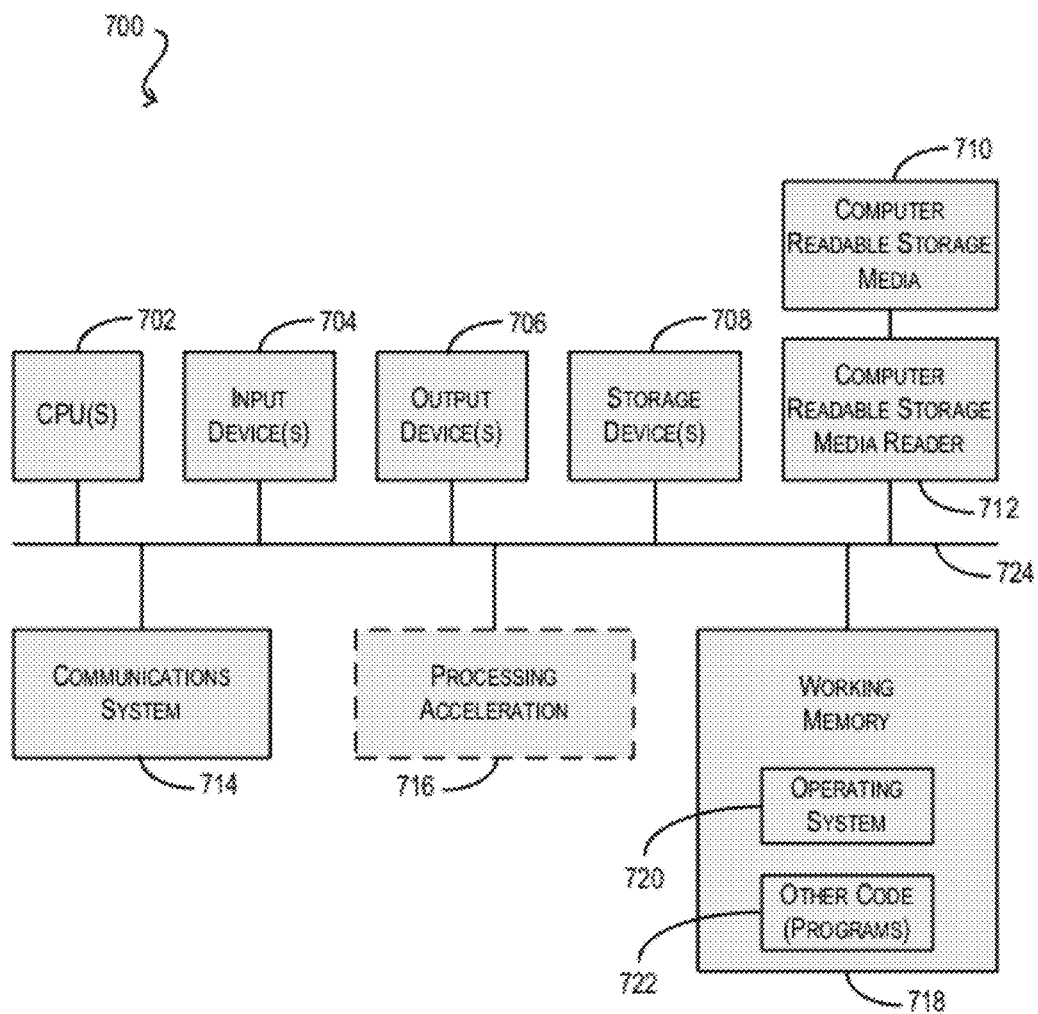
FIG. 7 is a simplified block diagram illustrating a computer system that can be used in accordance with an embodiment of the present invention.

FIG. 7 is a simplified block diagram illustrating a computer system 700 that can be used in accordance with an embodiment of the present invention. In various embodiments, computer system 700 can be used to implement any of computers 602, 604, 606, 608, and 610 described with respect to system environment 600 above. As shown, computer system 700 can include hardware elements that are electrically coupled via a bus 724. The hardware elements can include one or more central processing units (CPUs) 702, one or more input devices 704 (e.g., a mouse, a keyboard, etc.), and one or more output devices 706 (e.g., a display device, a printer, etc.). Computer system 700 can also include one or more storage devices 708. By way of example, the storage device(s) 708 can include devices such as disk drives, optical storage devices, and solid-state storage devices such as a random access memory (RAM) and/or a read-only memory (ROM), which can be programmable, flash-updateable and/or the like.

Computer system 700 can additionally include a computer-readable storage media reader 712, a communications subsystem 714 (e.g., a modem, a network card (wireless or wired), an infra-red communication device, etc.), and working memory 718, which can include RAM and ROM devices as described above. In some embodiments, computer system 700 can also include a processing acceleration unit 716, which can include a digital signal processor (DSP), a special-purpose processor, and/or the like.

Computer-readable storage media reader 712 can be connected to a computer-readable storage medium 710, together (and, optionally, in combination with storage device(s) 708) comprehensively representing remote, local, fixed, and/or removable storage devices plus storage media for temporarily and/or more permanently containing computer-readable information. Communications system 714 can permit data to be exchanged with network 612 and/or any other computer described above with respect to system environment 600.

Computer system 700 can also comprise software elements, shown as being currently located within working memory 718, including an operating system 720 and/or other code 722, such as an application program (which may be a client application, Web browser, middle tier/server application, etc.). It should be appreciated that alternative embodiments of computer system 700 can have numerous variations from that described above. For example, customized hardware can be used and particular elements can be implemented in hardware, software, or both. Further, connection to other computing devices such as network input/output devices can be employed.

Computer readable storage media for containing code, or portions of code, executable by computer system 700 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, or any other medium that can be used to store data and/or program code and that can be accessed by a computer.

Although specific embodiments of the invention have been described above, various modifications, alterations, alternative constructions, and equivalents are within the scope of the invention. Further, although embodiments of the present invention have been described with respect to certain flow diagrams and steps, it should be apparent to those skilled in the art that the scope of the present invention is not limited to the described diagrams/steps.

Yet further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A method comprising:
   determining, by a server in a computer system, a policy association between a web service policy and a policy subject associated with an application hosted by the server, the policy association being made while the server is offline;
   generating, by the computer system, a runtime usage association based on the policy association, wherein the runtime usage association is between the web service policy and the policy subject;

generating, by the computer system, one or more counts of a number of policy subjects with which the web service policy is associated, wherein generating the count comprises determining how many policy subjects are associated with the web services policy by one or more runtime usage associations; and generating, by the computer system, a user interface based upon the runtime usage association, the user interface configured to display one or more web service policies associated with one or more policy subjects of the application.

2. The method of claim 1, further comprising:
updating the runtime usage association in response to a change to the policy association made by an administrative tool,
wherein the change and the updating occur in real time while the server is online.

3. The method of claim 2, wherein determining the policy association comprises loading the policy association from a database, wherein the web service policy is associated in the database with the policy subject.

4. The method of claim 1, wherein determining the policy association comprises loading the policy association from policy attachment metadata associated with the policy subject.

5. The method of claim 4, wherein determining the policy association further comprises identifying at least one policy attachment association that is included in the policy attachment metadata and not included in the runtime usage association.

6. The method of claim 1, wherein generating the runtime usage association comprises storing the runtime usage association in a database at a location determined based upon the web service policy.

7. The method of claim 1, further comprising:
generating, by the computer system, a usage analysis of the web service policy, wherein the usage analysis lists at least one policy subject associated with the web service policy by at least one runtime usage association; and
displaying the usage analysis in the user interface.

8. The method of claim 1, further comprising:
generating information configured to display the one or more counts in the user interface.

9. The method of claim 1, further comprising:
determining, by the server being executed by the computer system and in response to a request in the user interface to modify the web service policy, whether the web service policy is associated with one or more policy subjects by one or more runtime usage associations;
prompting a user to confirm modification of the web service policy if the web service policy is associated with one or more policy subjects; and
modifying the web service policy if the user confirms the modification.

10. The method of claim 1, wherein the policy subject comprises a service, a reference, a domain identifier, an application server identifier, an application identifier, or a combination thereof.

11. A system comprising:
a processor configured to:
determine a policy association between a web service policy and a policy subject associated with an application hosted by a server, the policy association being made while the server is offline;
generate a runtime usage association based on the policy association, wherein the runtime usage association is between the web service policy and the policy subject;
generate one or more counts of a number of policy subjects with which the web service policy is associated, wherein to generate the count the processor is configured to determine how many policy subjects are associated with the web services policy by one or more runtime usage associations; and
generate a user interface based upon the runtime usage association, the user interface configured to display one or more web service policies associated with one or more policy subjects of the application.

12. The system of claim 11, wherein the processor is further configured to:
update the runtime usage association in response to a change to the policy association made by an administrative tool,
wherein the change and the update occur in real time while the server is online.

13. The system of claim 12, wherein the processor is further configured to load the policy association from a database, and the web service policy is associated in the database with the policy subject.

14. The system of claim 11, wherein the processor is further configured to load the policy association from policy attachment metadata associated with the policy subject.

15. The system of claim 14, wherein the processor is further configured to identify at least one policy attachment association that is included in the policy attachment metadata and not included in the runtime usage association.

16. The system of claim 11, wherein the processor is further configured to store the runtime usage association in a database at a location determined based upon the web service policy.

17. The system of claim 11, wherein the processor is further configured to:
generate a usage analysis of the web service policy, wherein the usage analysis lists at least one policy subject associated with the web service policy by at least one runtime usage association; and
display the usage analysis in the user interface.

18. A non-transitory machine-readable medium for a computer system, the non-transitory machine-readable medium having stored thereon a series of instructions executable by a processor, the series of instructions comprising:
instructions that cause the processor to determine a policy association between a web service policy and a policy subject associated with an application hosted by a server, the policy association being made while the server is offline;
instructions that cause the processor to generate a runtime usage association based on the policy association, wherein the runtime usage association is between the web service policy and the policy subject;
instructions that cause the processor to generate one or more counts of a number of policy subjects with which the web service policy is associated, wherein to generate the count the processor is configured to determine how many policy subjects are associated with the web services policy by one or more runtime usage associations; and
instructions that cause the processor to generate a user interface based upon the runtime usage association, the user interface configured to display one or more web service policies associated with one or more policy subjects of the application.

19. The non-transitory machine-readable medium of claim 18, the series of instructions executable by the processor further comprising:

instructions that cause the processor to update the runtime usage association in response to a change to the policy association made by an administrative tool,
wherein the change and the update occur in real time while the server is online.

20. The non-transitory machine-readable medium of claim 19, the series of instructions executable by the processor further comprising instructions that cause the processor to load the policy association from a database,
wherein the web service policy is associated in the database with the policy subject.

21. The non-transitory machine-readable medium of claim 18, the series of instructions executable by the processor further comprising instructions that cause the processor to load the policy association from policy attachment metadata associated with the policy subject.

22. The non-transitory machine-readable medium of claim 21, the instructions that cause the processor to determine the policy association further comprising:
instructions that cause the processor to identify at least one policy attachment association that is included in the policy attachment metadata and not included in the runtime usage association.

23. The non-transitory machine-readable medium of claim 18, the instructions that cause the processor to generate the runtime usage association further comprising instructions that cause the processor to store the runtime usage association in a database at a location determined based upon the web service policy.

24. The non-transitory machine-readable medium of claim 18, the series of instructions executable by the processor further comprising:
instructions that cause the processor to generate a usage analysis of the web service policy, wherein the usage analysis lists at least one policy subject associated with the web service policy by at least one runtime usage association; and
instructions that cause the processor to display the usage analysis in the user interface.

25. The non-transitory machine-readable medium of claim 18, the series of instructions executable by the processor further comprising:
instructions that cause the processor to display the one or more counts in the user interface.

\* \* \* \* \*

UNITED STATES PATENT AND TRADEMARK OFFICE
CERTIFICATE OF CORRECTION

| | | |
|---|---|---|
| PATENT NO. | : 8,650,288 B2 | Page 1 of 1 |
| APPLICATION NO. | : 13/118944 | |
| DATED | : February 11, 2014 | |
| INVENTOR(S) | : Yamuna et al. | |

It is certified that error appears in the above-identified patent and that said Letters Patent is hereby corrected as shown below:

In the Specification

In column 6, line 25, after "types" insert -- of --.

In column 10, line 23, delete "111" and insert -- 111. --, therefor.

In column 12, line 39, delete "running)" and insert -- running). --, therefor.

Signed and Sealed this
First Day of July, 2014

Michelle K. Lee
*Deputy Director of the United States Patent and Trademark Office*